United States Patent
Kim et al.

(10) Patent No.: US 8,704,910 B2
(45) Date of Patent: Apr. 22, 2014

(54) APPARATUS AND METHOD FOR CLASSIFYING IMAGES

(75) Inventors: Ji-Hye Kim, Goyang-si (KR); Sung-Dae Cho, Yongin-si (KR); Min-Kyu Park, Seoul (KR); Hee-Chan Park, Seoul (KR); Jin-Ho Kim, Seoul (KR); Yun-Je Oh, Suwon-si (KR); Kyoung-Tae Kim, Incheon (KR); Choon-Woo Kim, Seoul (KR); Seul-Ki Jang, Incheon (KR)

(73) Assignees: Samsung Electronics Co., Ltd (KR); Inha-Industry Partnership Institute (KR)

( * ) Notice: Subject to any disclaimer, the term of this patent is extended or adjusted under 35 U.S.C. 154(b) by 836 days.

(21) Appl. No.: 12/704,291

(22) Filed: Feb. 11, 2010

(65) Prior Publication Data

US 2010/0238316 A1 Sep. 23, 2010

(30) Foreign Application Priority Data

Feb. 23, 2009 (KR) .......................... 10-2009-0014833

(51) Int. Cl.
*H04N 9/73* (2006.01)
*G06K 9/00* (2006.01)

(52) U.S. Cl.
USPC ........................................ 348/223.1; 382/167

(58) Field of Classification Search
USPC ................ 348/223.1; 384/162, 164, 165, 167
See application file for complete search history.

(56) References Cited

U.S. PATENT DOCUMENTS

| 7,190,394 | B2 | 3/2007 | Kaplinsky et al. |
| 7,929,025 | B2* | 4/2011 | Liu ............................ 348/223.1 |
| 2006/0008139 | A1 | 1/2006 | Hirota et al. |
| 2006/0153444 | A1* | 7/2006 | Trimeche et al. ............. 382/167 |

FOREIGN PATENT DOCUMENTS

| JP | 11-331626 | 11/1999 |
| JP | 2008-042694 | 2/2008 |
| KR | 1020000061820 | 10/2000 |
| KR | 1020080077742 | 8/2008 |

* cited by examiner

*Primary Examiner* — Twyler Haskins
*Assistant Examiner* — Carramah J Quiett
(74) *Attorney, Agent, or Firm* — The Farrell Law Firm, P.C.

(57) ABSTRACT

An image classification apparatus and method for Automatic White Balance (AWB) are provided. An input image is divided into blocks including pluralities of pixels. A hue value and a chroma value are calculated for each of the blocks. A color-changed block is detected by calculating, for each one of the blocks, differences between the hue and chroma values calculated for all blocks adjacent to the one of the blocks and the hue and chroma values calculated for the one of the blocks. A hue variance and a chroma variance are calculated for the entire input image if a number of the detected color-changed blocks is greater than or equal to a first threshold. The input image is determined as a non-monochromatic image, if the hue variance is greater than or equal to a second threshold or the chroma variance is greater than or equal to a third threshold.

12 Claims, 5 Drawing Sheets

APPARATUS AND METHOD FOR CLASSIFYING IMAGES

PRIORITY

This application claims priority under 35 U.S.C. §119(a) to a Korean Patent Application filed in the Korean Intellectual Property Office on Feb. 23, 2009 and assigned Serial No. 10-2009-0014833, the entire disclosure of which is incorporated herein by reference.

BACKGROUND OF THE INVENTION

1. Field of the Invention

The present invention relates generally to an apparatus and method for classifying images, and more particularly, to an image classification apparatus and method for determining whether an input image is a monochromatic image or a non-monochromatic image and applying Automatic White Balance (AWB) to the non-monochromatic image.

2. Description of the Related Art

Generally, a white object is viewed in a color different from its original color according to the light source such as the sun, a fluorescent lamp and an incandescent lamp. AWB is an image technology proposed to adjust images so that the white object can be viewed in a white color. Regarding adaptability to colors, a human being may not perceive a difference in color for an object when there is a change in illumination and/or location. However, a conventional camera, which does not perceive and process objects in the same manner as a human being, may perceive a difference in color for an object according to the illumination and location. Therefore, the AWB technology is used to control a phenomenon that a color changes according to the light source in the camera.

The AWB technology is classified according to estimation of a light source. An AWB technology that estimates a light source adjusts a gain of each channel by finding a white region(s) of an input image and using an average of Red-Green-Blue (RGB) values of image information or an average of color difference signals (R-Y) and (B-Y), which correspond to the adjusted gain. An AWB technology that does not estimate a light source adjusts a gain of each channel using an average for each channel over the entire image. In these technologies, when an input image has a sufficient color change, a color consisting of an average for each channel is assumed to be a gray color. That is, it is possible to recover white balance of an image by adjusting gains of RGB values of the image so that an average for each channel is equal.

Conventionally, in this way, AWB is applied to an input image that has a sufficient color change or a white region.

However, if AWB is applied to an input image that is determined as an image having a color change, but does not actually have a sufficient color change or if AWB is applied to an input image that does not have a white region, like a large monochromatic object or a monochromatic background, then the color of the image may be distorted by the AWB.

SUMMARY OF THE INVENTION

An aspect of the present invention is to address at least the above-mentioned problems and/or disadvantages and to provide at least the advantages described below. Accordingly, an aspect of the present invention provides an image classification apparatus and method for minimizing distortion of color during application of AWB.

According to one aspect of the present invention, there is provided an apparatus for classifying an image. The apparatus includes an image divider for dividing an input image into blocks each of which includes a plurality of pixels; and an image type determiner for calculating a hue value and a chroma value for each of the blocks, determining whether each one of the blocks is a color-changed block by calculating differences between the hue value and chroma value calculated for all blocks adjacent to the one of the blocks and the hue value and chroma value calculated for the one of the blocks, calculating a hue variance and a chroma variance for the entire input image if a number of the determined color-changed blocks is greater than or equal to a first preset threshold, and determining the input image as a non-monochromatic image if the hue variance is greater than or equal to a second preset threshold or the chroma variance is greater than or equal to a third preset threshold.

According to one aspect of the present invention, there is provided a method for classifying an image. The method includes dividing an input image into blocks each of which includes a plurality of pixels; calculating a hue value and a chroma value for each of the blocks; determining whether each one of the blocks is a color-changed block by calculating differences between the hue value and the chroma value calculated for all blocks adjacent to the one of the blocks and the hue value and the chroma value calculated for the one of the blocks; calculating a number of the determined color-changed blocks and comparing the number of the detected color-changed blocks with a first preset threshold; calculating a hue variance and a chroma variance for the entire input image if the number of the detected color-changed blocks is greater than or equal to the first threshold, and determining whether the hue variance is greater than or equal to a second preset threshold and the chroma variance is greater than or equal to a third preset threshold; and determining the input image as a non-monochromatic image, if the hue variance is greater than or equal to the second preset threshold or the chroma variance is greater than or equal to the third preset threshold.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS

The following description with reference to the accompanying drawings is provided to assist in a comprehensive understanding of embodiments of the invention as defined by the claims and their equivalents. The detailed description includes various specific details to assist in that understanding but these specific details are to be regarded as examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Figure 1:
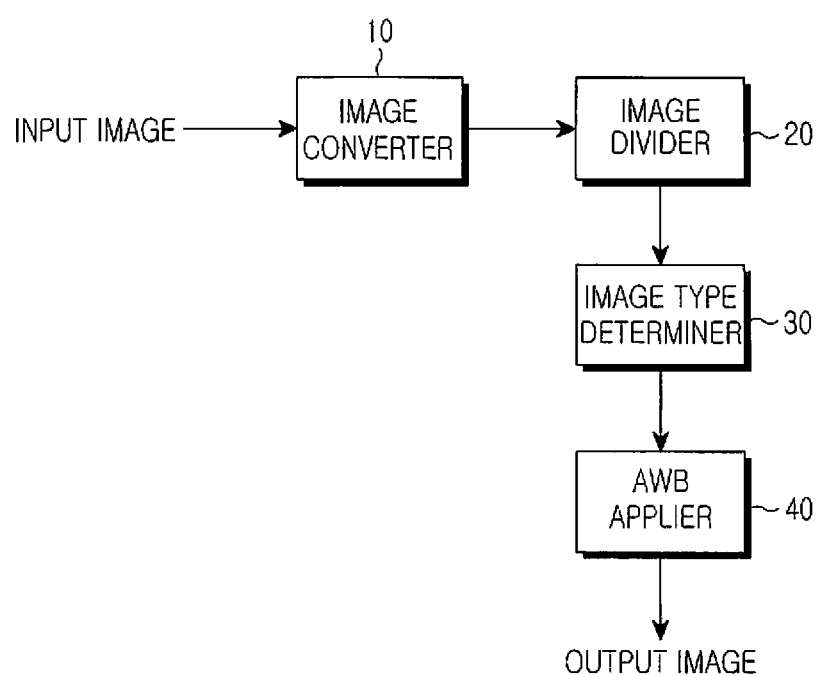
FIG. 1 is a diagram illustrating a structure of an image classification apparatus according to an embodiment of the present invention.

Referring to FIG. 1, an image classification apparatus according to an embodiment of the present invention includes an image converter 10, an image divider 20, an image type determiner 30, and an AWB applier 40.

The image converter 10 converts an input image into a luminance/blue-chrominance/red-chrominance (YCbCr) space, and outputs it to the image divider 20. Here, YCbCr, a color space used in an image system, is used as a color difference signal. Equation (1) blow is used for the YCbCr conversion from RGB values.

$$Y = 0.2990R + 0.5870G + 0.1140B$$

$$Cb = -0.1687R + 0.3313G + 0.5000B$$

$$Cr = 0.5000R + 0.4187G + 0.0813B \quad (1)$$

The image divider 20 divides the converted image into n×m blocks (where n and m are integers), and outputs them to the image type determiner 30.

The image type determiner 30 determines whether the input image is a monochromatic image or a non-monochromatic image. Specifically, the image type determiner 30 determines whether there is a change in color in each of the n×m blocks, and determines the number of color-changed blocks.

More specifically, the image type determiner 30 calculates a hue value and a chroma value for each block, and determines a particular block as a color-changed block if differences between a hue value and a chroma value calculated for the block and a hue value and a chroma value calculated for adjacent blocks are greater than or equal to a preset color-change threshold. The term "color-change thresholds" refers to values preset to determine color-changed blocks. Color-change thresholds may all have the same value or have different values.

After a determination of whether a block is color-changed is performed for all blocks constituting the input image, the image type determiner 30 determines the number of color-changed blocks and determines whether the number of color-changed blocks is greater than or equal to a preset threshold number of color-changed blocks.

If the number of color-changed blocks is less than the threshold number of color changed blocks, the image type determiner 30 determines the input image as a monochromatic image, and if the number of color-changed blocks is greater than or equal to the threshold number of color-changed blocks, the image type determiner 30 calculates a hue variance and a chroma variance for the entire input image and determines the input image as a monochromatic image or a non-monochromatic image according to the calculation.

More specifically, the image type determiner 30 calculates a hue average and a chroma average for all blocks of the input image. The average of the hue values and chroma values are calculated by dividing the chroma values and the hue values, respectively, by the total number of blocks.

Thereafter, the image type determiner 30 adds differences between the calculated hue average and chroma average and a hue value and a chroma value calculated for each of the blocks. Then, the image type determiner divides the added difference by the total number of blocks to calculate a hue variance and a chroma variance for the entire image. In the present invention, the image type determiner 30 may calculate differences between the calculated hue average and chroma average and absolute values of a hue value and a chroma value calculated for each of the blocks, or squares of the differences, in addition to the differences between the calculated hue average and chroma average and a hue value and a chroma value calculated for each of the blocks.

The image type determiner 30 compares the calculated hue variance with a preset hue variance threshold and compares the calculated chroma variance with a preset chroma variance threshold.

If the calculated hue variance is greater than or equal the hue variance threshold and the calculated chroma variance is greater than or equal the chroma variance threshold, the image type determiner 30 determines the input image as a monochromatic image.

If the calculated hue variance is less than the hue variance threshold or the calculated chroma variance is less than the chroma variance threshold, the image type determiner 30 determines the input image as a non-monochromatic image.

Accordingly, the image type determiner 30 can more definitely classify an input image as a monochromatic image or a non-monochromatic image by determining a monochromatic image or a non-monochromatic image based on the hue variance and chroma variance.

After the classifying of the image as a monochromatic image or a non-monochromatic image, the AWB applier 40 applies AWB to an input image that is determined as a non-monochromatic image. Specifically, the AWB applier 40 performs AWB using color information of the color-changed blocks determined in the classification process.

The AWB applier 40 calculates a gain used to perform AWB for each RGB channel using average RGB values of the color-changed blocks, and the gains are calculated using Equation (2) below.

$$\begin{cases} R_{gain} = \dfrac{(\overline{R} + \overline{G} + \overline{B})/3}{\overline{R}} \\ G_{gain} = \dfrac{(\overline{R} + \overline{G} + \overline{B})/3}{\overline{G}} \\ B_{gain} = \dfrac{(\overline{R} + \overline{G} + \overline{B})/3}{\overline{B}} \end{cases} \quad (2)$$

After calculating gains using Equation (2), the AWB applier 40 performs AWB using Equation (3) below.

$$\begin{cases} R' = R \times R_{gain} \\ G' = G \times G_{gain} \\ B' = B \times B_{gain} \end{cases} \quad (3)$$

According to the above-described embodiment of the present invention, an input image can be precisely classified as a monochromatic image or a non-monochromatic image, and then perform AWB thereon.

Figure 2:
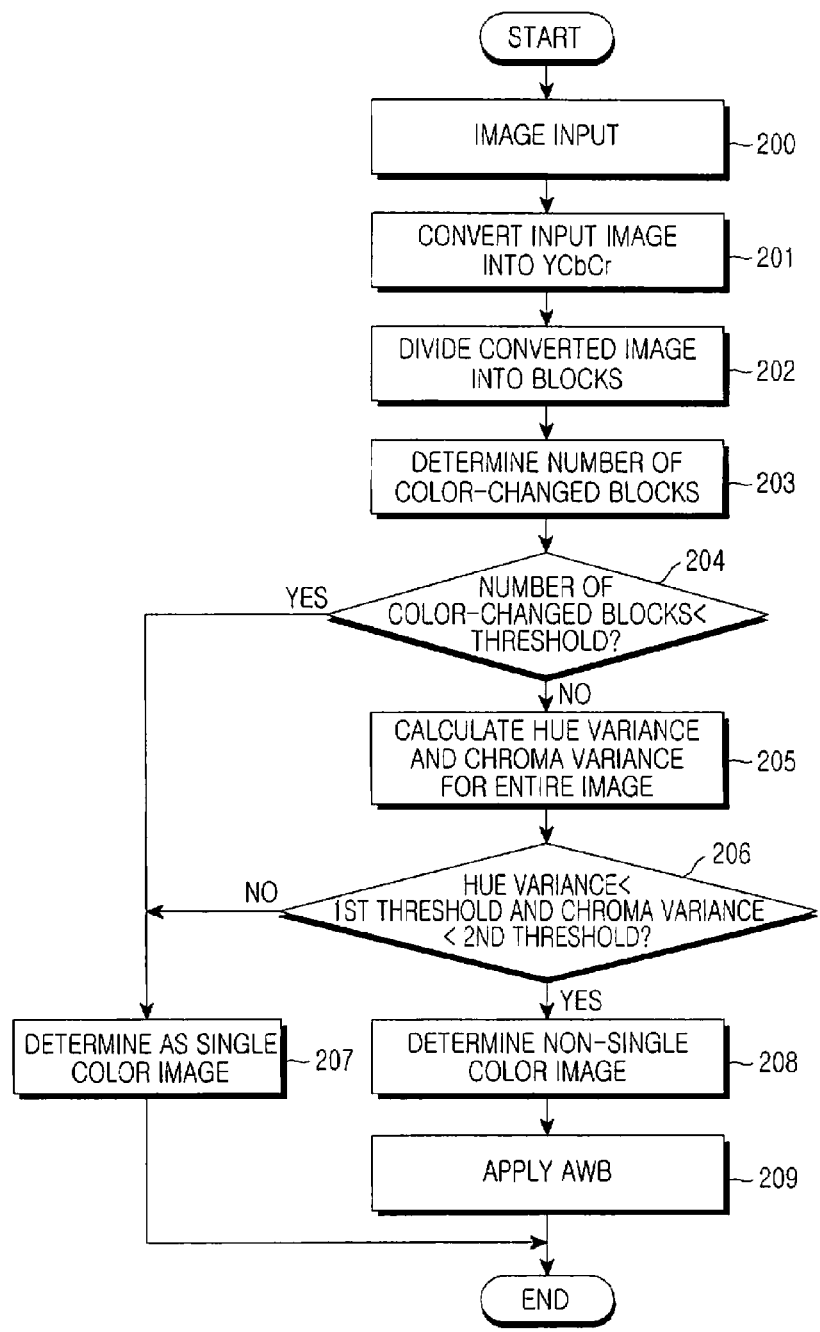
FIG. 2 is a flowchart illustrating a process of discriminating a monochromatic image and a non-monochromatic image and performing AWB according to an embodiment of the present invention.

Referring to FIG. 2, a flowchart illustrates a process of discriminating a monochromatic image and a non-monochromatic image and performing AWB in an image classification apparatus according to an embodiment of the present invention.

Upon receiving an input image in step 200, the image converter 10 converts the input image into a YCbCr space and outputs the converted to the image divider 20 in step 201.

In step 202, the image divider 20 divides the converted image into a plurality of blocks and outputs the blocks to the image type determiner 30.

In step 203, the image type determiner 30 determines the number of color-changed blocks. This determination of the number of color-changed blocks is described in detail with reference to FIG. 3, which is a detailed diagram of step 203 in FIG. 2.

Figure 3:
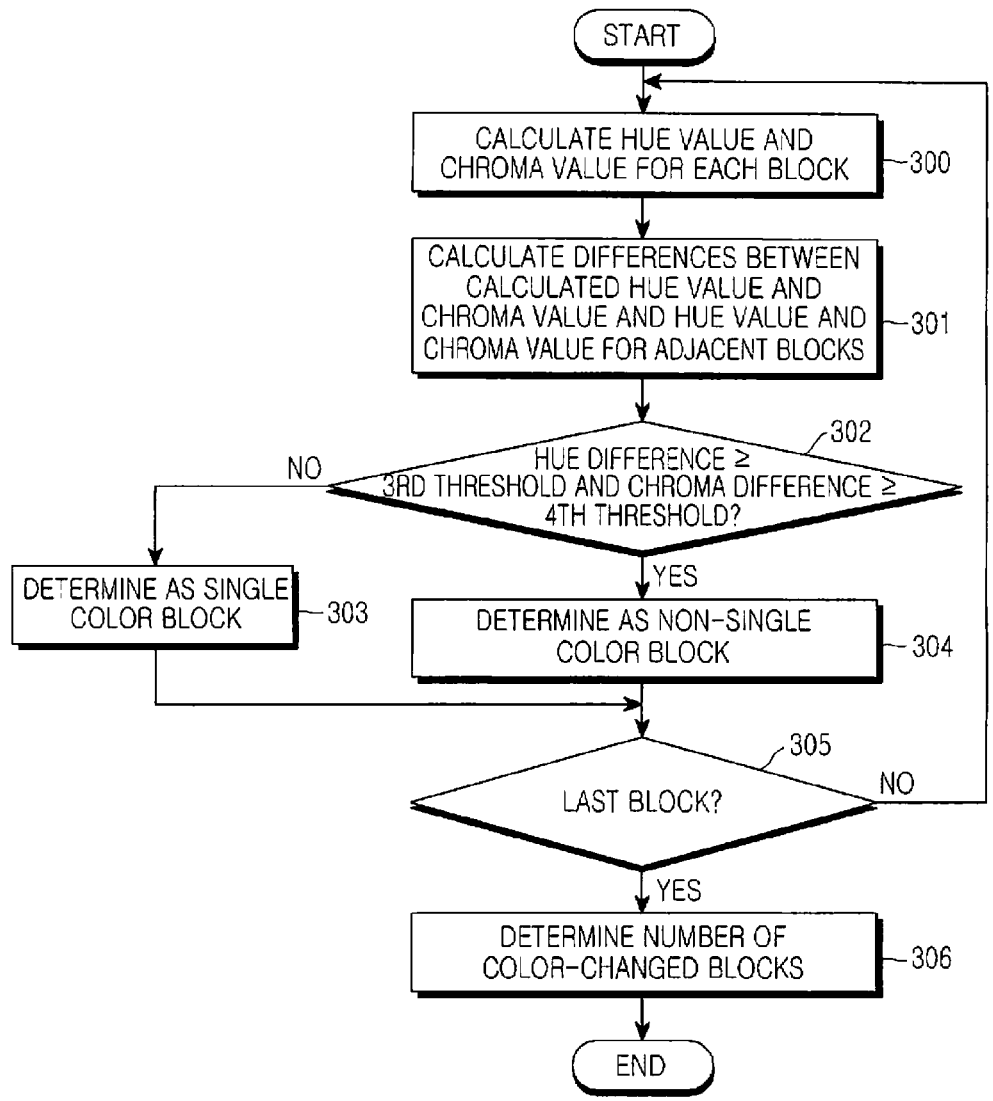
FIG. 3 is a flowchart illustrating a process for calculating the number of color-changed blocks according to an embodiment of the present invention.

FIG. 3 is a flowchart illustrating a process for calculating the number of color-changed blocks according to an embodiment of the present invention. In step 300, the image type determiner 30 calculates a hue value and a chroma value for each block of the input image.

In step 301, the image type determiner 30 calculates differences between the hue value and the chroma value calculated for each block, and calculates hue values and chroma values of blocks adjacent to each block.

In step 302, the image type determiner 30 determines, for each block, whether the difference between hue values of the block and blocks adjacent to the relevant block, is greater than or equal to a third threshold preset to determine whether the relevant block is a color-changed block. The image type determiner 30 further determines whether difference between chroma values is greater than or equal to a fourth threshold preset to determine whether the relevant block is a color-changed block.

If the difference between hue values is less than the third threshold and the difference between the chroma values is less than the fourth threshold, the image type determiner 30 determines that the relevant block is a non-color-changed block in step 303. Otherwise, the image type determiner 30 proceeds to step 304.

In step 304, the image type determiner 30 determines that the relevant block is a color-changed block.

In step 305, the image type determiner 30 determines whether the current relevant block is the last block of the input image. If the current relevant block is the last block, the image type determiner 30 proceeds to step 306. Otherwise, the image type determiner 30 returns to step 300 and repeats steps 300 through 305, for each block, until the current block is the last block, which indicates that the determination has been for all blocks of the image.

In step 306, the image type determiner 30 determines the number of color-changed blocks.

In step 204 of FIG. 2, the image type determiner 30 determines whether the number of color-changed blocks determined in step 203 is less than a preset threshold. If the number of color-changed blocks is greater than or equal to the threshold, the image type determiner 30 proceeds to step 205, and if the number of color-changed blocks is less than the threshold, the image type determiner 30 determines the input image as a monochromatic image in step 207.

Figure 4A:
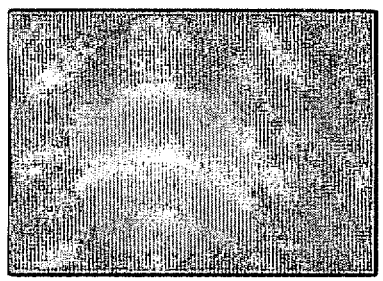
FIGS. 4A to 4C are diagrams illustrating a monochromatic image and a non-monochromatic image classified according to an embodiment of the present invention.
Figure 4B:
Figure 4C:
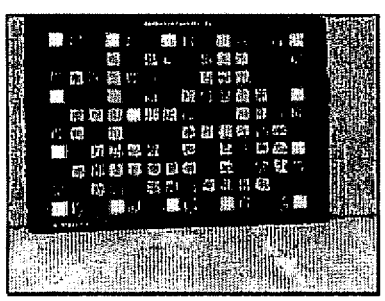

FIGS. 4A, 4B, and 4C are examples of images with varying degrees of hue and chroma variance. As FIG. 4A has less hue and chroma variance than FIGS. 4B and 4C, depending on predetermined threshold, a method according to the present invention may classify FIG. 4A as a monochromatic image while classifying FIGS. 4B and 4C as non-monochromatic images.

In step 205, the image type determiner 30 calculates a hue variance and a chroma variance for the entire image.

In step 206, the image type determiner 30 classifies an image as a monochromatic image or a non-monochromatic image by comparing the hue variance to a first threshold preset threshold and comparing the chroma variance to a second preset threshold.

If the hue variance is less than the first threshold and the chroma variance is less than the second threshold, the image type determiner 30 determines the input image as a monochromatic image in step 207. Otherwise, the image type determiner 30 proceeds to step 208.

In step 208, the image type determiner 30 determines that the input image is a non-monochromatic image and outputs the input image to the AWB applier 40.

In step 209, the AWB applier 40 applies AWB to the non-monochromatic image.

For example, since an image shown in FIG. 4B has two colors and its color change is insignificant, this image should be classified as a monochromatic image. However, in a case where an image is classified using the hue value, if a color change exists between the image and its adjacent blocks as shown in FIG. 4C and the number of color-changed blocks is greater than or equal to a threshold, the image is classified as a non-monochromatic image.

To consider this case, the input image is classified once again into a monochromatic image and a non-monochromatic image using the hue variance and the chroma variance as described above.

Figure 5A:
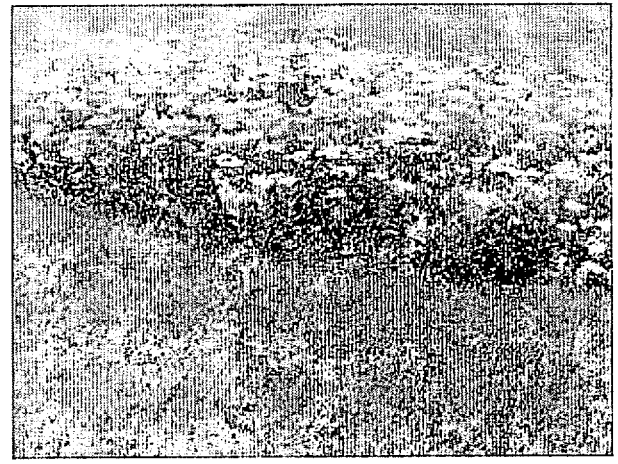
FIGS. 5A and 5B are diagrams illustrating images to which AWB is applied according to an embodiment of the present invention.
Figure 5B:
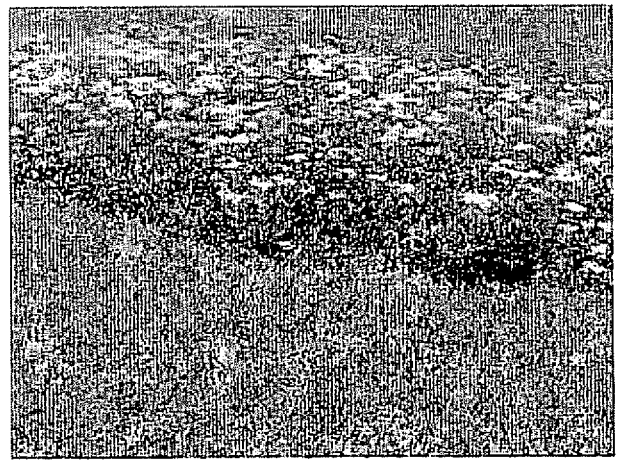

An image having large hue variance and chroma variance indicates that a color change among blocks is significant, which means that the image is a non-monochromatic image as shown in FIG. 4B. If the non-monochromatic image of FIG. 4B is an input image, the image is classified as a non-monochromatic image using the hue variance and the chroma variance. Finally, therefore, the AWB applier 40 outputs an image of FIG. 5B by applying AWB to the input image of FIG. 5A that is classified as a non-monochromatic image.

As is apparent from the foregoing description, exemplary embodiments of the present invention can classify a non-monochromatic image as a monochromatic image or a non-monochromatic image once again using the hue variance and chroma variance, making it possible to more definitely classify the monochromatic image and the non-monochromatic image.

The present invention can minimize distortion of color in applying AWB to an input image by exactly determining whether the input image is a monochromatic image or a non-monochromatic image using the hue variance and the chroma variance.

Accordingly, the present invention can minimize distortion of color due to a light source with regard to an image having a large monochromatic object or background, thereby improving the quality of the image.

While the invention has been shown and described with reference to a certain embodiments thereof, it will be understood by those skilled in the art that various changes in form and details may be made therein without departing from the spirit and scope of the invention as defined by the appended claims and their equivalents.

What is claimed is:

1. An apparatus for classifying an image, comprising:
   an image divider for dividing an input image into blocks, wherein each block includes a plurality of pixels; and
   an image type determiner for calculating a hue value and a chroma value for each of the blocks, determining, for each one of the blocks, whether the one of the blocks is a color-changed block by calculating differences between the hue value and chroma value calculated for all blocks adjacent to the one of the blocks and the hue value and chroma value calculated for the one of the blocks, calculating a hue variance and a chroma variance for the entire input image if a number of determined color-changed blocks is greater than or equal to a first preset threshold, and determining that the input image is a non-monochromatic image if the hue variance is greater than or equal to a second preset threshold or the chroma variance is greater than or equal to a third preset threshold.

2. The apparatus of claim 1, wherein the image type determiner determines that the input image is a monochromatic image, if the number of the determined color-changed blocks is less than the first preset threshold.

3. The apparatus of claim 1, wherein the image type determiner determines the input image as a monochromatic image, if the hue variance is less than the second preset threshold and the chroma variance is less than the third preset threshold.

4. The apparatus of claim 1, wherein the image type determiner determines that the one of the blocks is a color-changed block when a difference between the hue value calculated for all the blocks adjacent to the one block and the hue value calculated for the one of the blocks is greater than or equal to a preset fourth preset threshold, or a difference between the chroma value calculated for all the blocks adjacent to the one of the blocks and the chroma value calculated for the one of the blocks is greater than or equal to a preset fifth preset threshold.

5. The apparatus of claim 4, wherein the image type determiner determines that the one of the blocks is a non-color-changed block when the difference between the hue value calculated for all the blocks adjacent to the one of the blocks and the hue value calculated for the one of the blocks is less than the fourth preset threshold, and the difference between the chroma value calculated for all the blocks adjacent to the one of the blocks and the chroma value calculated for the one of the blocks is less than the fifth preset threshold.

6. The apparatus of claim 1, further comprising an Automatic White Balance (AWB) applier for applying white balance to the input image, upon determining that the input image is a non-monochromatic image.

7. A method for classifying an image, comprising:
dividing an input image into blocks, wherein each block includes a plurality of pixels;
calculating a hue value and a chroma value for all the blocks, and a hue value and a chroma value for each of the blocks;
determining, for each one of the blocks, whether the one of the blocks is a color-changed block by calculating differences between the hue value and the chroma value calculated for all blocks adjacent to the one of the blocks and the hue value and the chroma value calculated for the one of the blocks;
calculating a number of the detected color-changed blocks and comparing the number of the detected color-changed blocks with a first preset threshold;
calculating a hue variance and a chroma variance for the entire input image if the number of the determined color-changed blocks is greater than or equal to the first preset threshold, and determining whether the hue variance is greater than or equal to a second preset threshold and the chroma variance is greater than or equal to a third preset threshold; and
determining that the input image is a non-monochromatic image, if the hue variance is greater than or equal to the second preset threshold or the chroma variance is greater than or equal to the third preset threshold.

8. The method of claim 7, further comprising determining that the input image is a monochromatic image, if a number of the determined color-changed blocks is less than the first preset threshold.

9. The method of claim 7, further comprising determining that the input image is a monochromatic image, if the hue variance is less than the second preset threshold and the chroma variance is less than the third preset threshold.

10. The method of claim 9, wherein determining whether the one of the blocks is a color-changed block comprises:
comparing a difference between the hue values calculated for all the blocks adjacent to the one of the blocks and the hue value calculated for the one of the blocks with a preset fourth threshold, and comparing a difference between the chroma value calculated for all the blocks adjacent to the one of the blocks and the chroma value calculated for the one of the blocks with a preset fifth preset threshold; and
determining that the one of the blocks is a color-changed block, when the differences between the hue values calculated for all the blocks adjacent to the one of the blocks and the hue value calculated for the one of the blocks is greater than or equal to the fourth preset threshold, or the difference between the chroma value calculated for all the blocks adjacent to the one of the blocks and the chroma value calculated for the one of the blocks is greater than or equal to the fifth preset threshold.

11. The method of claim 10, further comprising determining that the one of the blocks is a non-color-changed block when the difference between the hue value calculated for all the blocks adjacent to the one of the blocks and the hue value calculated for the one of the blocks is less than the fourth preset threshold, and the difference between the chroma value calculated for all the blocks adjacent to the one of the blocks and the chroma value calculated for the one of the blocks is less than the fifth preset threshold.

12. The method of claim 7, further comprising applying white balance to the input image after determining the input image as a non-monochromatic image.

* * * * *